United States Patent
Takeda et al.

(10) Patent No.: US 7,592,055 B2
(45) Date of Patent: Sep. 22, 2009

(54) MOISTURE-PERMEABLE WATERPROOF FILM, COMPOSITE MATERIAL, AND PROCESSES FOR PRODUCING THESE

(75) Inventors: Keiji Takeda, Numazu (JP); Gen Koide, Mishima (JP)

(73) Assignee: Toray Industries, Inc., Tokyo (JP)

( * ) Notice: Subject to any disclaimer, the term of this patent is extended or adjusted under 35 U.S.C. 154(b) by 151 days.

(21) Appl. No.: 10/542,594

(22) PCT Filed: Jan. 29, 2004

(86) PCT No.: PCT/JP2004/000860

§ 371 (c)(1),
(2), (4) Date: Apr. 5, 2006

(87) PCT Pub. No.: WO2004/069903

PCT Pub. Date: Aug. 19, 2004

(65) Prior Publication Data

US 2007/0036983 A1    Feb. 15, 2007

(30) Foreign Application Priority Data

Feb. 4, 2003 (JP) .............................. 2003-026801
Feb. 4, 2003 (JP) .............................. 2003-026803

(51) Int. Cl.
*B65B 53/00* (2006.01)
*B32B 27/12* (2006.01)

(52) U.S. Cl. ..................................... 428/35.1; 442/394

(58) Field of Classification Search ................. 442/394; 428/172, 147, 35.1
See application file for complete search history.

(56) References Cited

FOREIGN PATENT DOCUMENTS

JP          01006068 A   *   6/1987

* cited by examiner

*Primary Examiner*—Lynda Salvatore
(74) *Attorney, Agent, or Firm*—Pillsbury Winthrop Shaw Pittman LLP

(57) ABSTRACT

This invention provides a moisture-permeable, waterproof film characterized in that it consists of two or more resin layers comprising, as polymerizing components, bishidroxyalkyl aliphatic acid and alkyleneglycol, said bishydroxyalkyl aliphatic acid content is 0.08 mmol/g to 0.5 mmol/g, at least a part of said alykyleneglycol is polyethylene glycol contained in an amount of 40 wt % to 80 wt % based on said solid resin, and a moisture permeability by JIS L-1099 "Potassium Acetate Method" (B-1 method) at average film thickness of 20 micrometers being not less than $3 \times 10^3$ $g/m^2 \cdot 24$ h and not more than $200 \times 10^3$ $g/m^2 \cdot 24$ h, and a moisture-permeable waterproof composite material to which said moisture-permeable, waterproof film is provided at least on one surface of a substrate material and its moisture permeability by JIS L-1099 "Potassium Acetate Method" (B-1 method) being not less than $1 \times 10^3$ $g/m^2 \cdot 24$ h and not more than $50 \times 10^3$ $g/m^2 \cdot 24$ h.

This invention makes use of a polymer having excellent moisture permeability, waterproofness durability and capability of being made aqueous, and accordingly, this invention provides a moisture-permeable, waterproof film and a composite material which can be manufactured by an ecological process.

6 Claims, No Drawings

MOISTURE-PERMEABLE WATERPROOF FILM, COMPOSITE MATERIAL, AND PROCESSES FOR PRODUCING THESE

TECHNICAL FIELD

This invention provides a moisture-permeable, waterproof film and a composite material which can be manufactured by an ecological process by utilizing a polymer having an excellent moisture permeability, waterproofness, material durability and capability of being made aqueous. In more detail, this invention relates to a moisture-permeable, waterproof film and a composite material which can be preferably used in the field of apparel or materials for apparel such as outdoor wear for fishing and mountaineering, ski wears, windbreakers, athletic wear, golf wear, tennis wear, rain wear, casual coats, outdoor work clothes, gloves and shoes, etc., and in the non-apparel field, such as for wallpaper and waterproof roof sheet, for building material such as tile, for a material of electronic instruments such as for a substrate film material of dehumidifier.

BACKGROUND ART

Conventionally, in order to obtain a moisture-permeable waterproof composite material which is excellent in moisture permeability and waterproofness, some methods have been taken such as introducing a hydrophilic part into a polymer chain or blending hydrophilic resin in a hydrophobic resin. In any cases, various methods have been investigated by modifying or blending organic solvent type resin (for example, refer to JP-A-1995-9631, JP-A-1995-3147).

In recent years, VOC (Volatile Organic Compounds) regulation has become enforceable in consideration of earth environment, and it has been desired to change resin solvent from organic solvent to aqueous solvent. Use of a hydrophilic resin in the field of moisture-permeable waterproof composite material has been partly tried (for example, refer to JP-A-1989-97272 and JP-A-1989-97274). However, there is still no technique in which moisture permeability and waterproofness are compatible like those in which organic solvent type resin is used and no technique which can be practically used has not been found out with the present technique. Furthermore, there is no technique having material durability together with practical performance.

In case of aqueous resin, by introducing hydrophilic-part in polymer chain in non-aqueous resin or by blending high moisture-permeable hydrophilic resin into low moisture-permeable resin, it has been very difficult to satisfy both of material performance and material durability because of remarkable decrease of film strength.

This invention, having regard to the above-mentioned present situation, provides a moisture-permeable, waterproof film and a composite material which can be manufactured by an ecological process, by utilizing a polymer with an excellent moisture permeability, waterproofness, material durability and capability of being made aqueous.

DISCLOSURE OF THE INVENTION

This invention relates to a moisture-permeable, waterproof film characterized in that it consists of a resin layer containing two or more resins comprising, as polymerizing components, bishydroxyalkyl aliphatic acid and alkyleneglycol, said bishydroxyalkyl aliphatic acid content is not less than 0.08 mmol/g and not more than 0.5 mmol/g based on said solid resin, at least a part of said alkyleneglycol is polyethylene glycol contained in an amount of not less than 20 wt % and not more than 60 wt % based on said solid resin, and a moisture permeability by JIS L-1099 "Potassium Acetate Method" (B-1 method) at average film thickness of 20 micrometers being not less than $3\times10^3$ g/m$^2$·24 h and not more than $200\times10^3$ g/m$^2$·24 h.

This invention relates to a moisture-permeable, waterproof film characterized in that it comprises a hydrophilic resin and has a moisture permeability by JIS L-1099 "Potassium Acetate Method" (B-1 method) at average film thickness of 20 micrometers of not less than $25\times10^3$ g/m$^2$·24 h and not more than $200\times10^3$ g/m$^2$·24 h.

This invention relates to a moisture-permeable waterproof composite material characterized in that a resin layer containing an aqueous resin is provided at least on one surface of a fibrous structure and its moisture permeability by JIS L-1099 "Potassium Acetate Method" (B-1 method) being not less than $8\times10^3$ g/m$^2$·24 h and not more than $50\times10^3$ g/m$^2$·24 h.

This invention relates to a method for manufacturing a moisture-permeable, waterproof film characterized in that, at providing, on a substrate material, a coating film obtainable by removing solvent from a coating liquid containing a resin, the coating liquid is prepared so that an organic solvent content in the coating liquid is not less than 0 wt % to not more than 10 wt % based on the solid resin and a coating, a film-forming and a lamination to the substrate material are carried out.

This invention relates to a method for manufacturing a moisture-permeable waterproof composite material characterized in that, in manufacturing a moisture-permeable waterproof composite material by providing, on a substrate material, a coating film obtainable by removing solvent from a coating liquid containing a resin, the coating liquid is prepared so that an organic solvent content in the coating liquid is not less than 0 wt % and not more than 10 wt % based on the solid resin and a coating, a film-forming and a lamination to the substrate material are carried out.

BEST MODE FOR CARRYING OUT THE INVENTION

In this invention, a resin layer containing two or more resins containing, as polymerizing components, bishydroxyalkyl aliphatic acid and alkyleneglycol is used.

The resin layer containing two or more resins containing, as polymerizing components, bishydroxyalkyl aliphatic acid and alkyleneglycol refers to a resin layer which consists of two or more different kind of polymers, containing these polymerizing components.

The bishydroxyalkyl aliphatic acid is a compound in which two hydroxylalkyl groups are bonded to an alkyl aliphatic acid main chain. Specifically, compounds having the same carbon number in hydroxyalkyl group with an increased carbon number in alkyl aliphatic acid group such as 2,2-bishydroxymethyl propionic acid and 2,2-bishydroxymethyl butanic acid, compounds having the same carbon number in alkyl aliphatic group with an increased carbon number in hydroxyalkyl group such as 2,2-bishydroxyethyl propionic acid and 2,2-bishydroxypropyl propionic acid can be listed but not limited thereto.

Bishydroxyalkyl aliphatic acid content in the resin layer is not less than 0.08 mmol/g and not more than 0.5 mmol/g based on the solid resin. In view of compatibility, each amount of the two or more resins is preferably not less than 0.16 mmol/g and not more than 0.33 mmol/g and the difference of the amounts is preferably not less than 0.08 mmol/g or less.

The amount of bishydroxy aliphatic acid mentioned here is the amount contained in the polymer constituting the resin as the polymerizing component, and by the amount contained in the polymer being inside of said range, moisture permeability and water resistance become compatible because blendability of resins and film strength are improved.

The amount of bishydroxy aliphatic acid can be expressed by acid value (mgKOH/g) when titrated by potassium hydroxide. If it is converted into acid value, in case of this invention, it is 5 to 30. In order to improve compatibility, it is preferable that the two acid values are in the range of 10 to 20 and the difference of the two are less than 5.

Furthermore, as alkylene glycol, compounds in which both end groups of alkylene chain are hydroxyl group such as ethylene glycol, propylene glycol, tetramethylene glycol, pentamethylene glycol, hexamethylene glycol or condensation product of thereof, specifically, polyethylene glycol, polypropylene glycol, polytetramethylene glycol, polypentamethylene, glycol, polyhexamethylene glycol can be listed but not limited thereto.

In addition, said alkylene glycol may be included as a part of polyester diol or polycarbonic ester diol.

In this invention, in view of compatibility between performance and film strength, it is preferable that the polyalkylene glycol group is included in the range of not less than 40 wt % and not more than 80 wt % based on the solid resin.

Although the portion of introduced alkylene glycol may be main chain or side chain, it is preferable to be the main chain having regard to the effectiveness. If the alkylene glycol is included in these portions of the polymer constituting the resin, softening of film caused by lowering Tg and increase of moisture permeability caused by polymer movement become possible.

In view of the compatibility between increasing high moisture permeability and film strength, it is preferable that the number average molecular weight of polyalkylene glycol is not less than 500 and not more than 3000, more preferably, the number average molecular weight is not less than 800 and not more than 2500.

In this invention, at least one of the alkylene glycol is polyethylene glycol, and it is included in the range of not less than 20 wt % and not more than 60 wt % based on the resin weight. By at least one of the alkylene glycol being polyethylene glycol, the moisture permeability of the coated film can be increased drastically. Although the moisture permeability can be increased if the amount of polyethylene glycol is high, it is preferable that the amount is not less than 30 wt % and not more than 50 wt % having, regard to film strength and durability. Having regard to the compatibility between increasing moisture permeability and film strength, it is preferable that the number average molecular weight of the polyethylene glycol is not less than 800 and not more than 2500. Having regard to increasing moisture permeability, although it is preferable that the polyethylene glycol is included, in all the resin constituting the film, having regard to film strength, it is not preferable. By making a specific resin only highly hydrophilic, it becomes possible that the other resin to be blended being stronger and highly hydrophobic and make it easy that moisture permeability and film strength are compatible, as a balance of whole film performance.

As the resin of this invention, polymers represented by polyurethane type, polyester type, polyamide type, acrylic type, silicone type, or copolymers consisting of two or more of those polymers can be listed, but not limited thereto.

The film of this invention has a moisture permeability by JIS L-1099 "Potassium Acetate Method" (B-1 method), at film thickness of 20 micrometers, of not less than $3 \times 10^3$ $g/m^2 \cdot 24$ h and not more than $200 \times 10^3$ $g/m^2 \cdot 24$ h.

By controlling the moisture permeability in this range by utilizing the polymer composition stated above, it becomes possible to make various applications as film alone or as laminated product.

The structure of the film is not limited specifically, and a nonporous film alone, a porous film alone, a laminated film of the same kind and a laminated film of the nonporous film/porous film can be listed, but not limited thereto.

The film thickness stated herein refers to the thickness of the film alone, and if it is laminated to a support or a substrate material, it refers to the value in which the thickness of the support or substrate material, etc., is deducted. The thickness can be determined by the method such as measuring directly with peacock or by observing cross section with SEM. The moisture permeability at film thickness 20 micrometers can be determined, for example, in case of a moisture permeability with an average film thickness of 50 micrometers of $3 \times 10^3$ $g/m^2 \cdot 24$ h and a moisture permeability at average film-thickness of 10 micrometers of $100 \times 10^3$ $g/m^2 \cdot 24$ h according to the above stated method, the moisture permeabilities at film thickness 20 micrometers in this invention are:

the former $(3 \times 10^3 \text{ g/m}^2 \cdot 24 \text{ h}) \div (50 \text{ μm}/20 \text{ μm}) = 1.2 \times 10^3 \text{ g/m}^2 \cdot 24 \text{ h}$ the latter $(20 \text{ μm}/10 \text{ μm}) \times (100 \times 10^3 \text{ g/m}^2 \cdot 24 \text{ h}) = 50 \times 10^3 \text{ g/m}^2 \cdot 24 \text{ h}$.

Here, it is preferable that the polyalkylene glycol is a polyalkylene glycol in which the number of repeating unit carbon atoms in the alkylene group is not less than 3 and not more than 12. By the alkylene glycol constituting the polymer being in this range, it is not only possible to further improve the compatibility with the polymer containing highly hydrophilic polyethylene glycol but also possible to contribute to increasing film strength by utilizing more hydrophobic polyalkylene glycol. Having regard to the compatibility between film strength and moisture permeability, it is preferable that the number average molecular weight of polyalkylene glycol is not less than 800 and not more than 2500, number of carbon atoms is 4 to 6, in particular, polytetramethylene glycol and hexamethylene glycol are preferred.

Furthermore, in this invention, it is preferable that both of said two resins are polyurethane type resin. It is because the texture and stretchability of the resin film alone or of laminated product with a substrate material are excellent, and in addition, even when film layers of different thickness are laminated, the layers can coordinate very closely with each other because the adherence with each other is good.

Polyurethane type resin is a resin which contains copolymer obtained through reaction between a polyisocyanate and a polyol as main component. In case of an aqueous resin, it can be a polyurethaneurea because a bond such as urea bond is introduced when a chain extension is carried out by a diamine, and the urea group may be included in the aqueous resin.

As an isocyanate component, aromatic polyisocyanate alone, aliphatic polyisocyanate alone or a mixture thereof can be used.

For example, tolylene diisocyanate, 4,4'-diphenylmethane diisocyanate, 4,4'-methylenebis(cyclohexyl isocyanate), hexamethylene diisocyanate, xylylene diisocyanate, isophorone diisocyanate, etc., can be used. On the other hand, as a polyol component, a polyether type polyol, a polyester type polyol, a polycarbonate type polyol, etc., can be used. As a polyether polyol, polyethylene glycol, polypropylene glycol, polytetramethylene glycol, polyhexamethylene glycol, etc., as a polyester polyol, a reaction product between diol such as ethylene glycol, propylene glycol with dibasic acid such as adipic acid, sebacic acid, terephthalic acid, isophthalic acid and a ring-opened polymerization product such as caprolactone, as a polycarbonate type polyol, an aromatic polycarbonate, an aliphatic polycarbonate synthesized by phosgene method, ester exchange method, etc., can be used. Other than that, an ether/ester type, an amide type, a silicone type, a fluorine type, various copolymer types can be properly used, but not limited thereto.

As polyisocyanate, having regard to resin film strength and solvent resistance, light resistance, etc., 4,4'-diphenylmethane diisocyanate, 4,4'-methylenebis(cyclohexyl isocyanate) are preferable. As polyol, having regard to resin film strength and hydrolysis resistance, polytetramethylene glycol, polyhexamethylene glycol, polyhexamethylene carbonate, and having regard to moisture permeability, polyurethane resin having polyethylene glycol as main component are preferable.

Furthermore, in this invention, it is preferable that the water resistance by JIS L-1092 "High Water Pressure Method" is not less than 0.1 MPa and not more than 1.0 MPa. By having the water resistance together with the above stated moisture permeability, it become possible that this invention can serve to create many applications.

This invention is a moisture-permeable waterproof composite material characterized in that a resin layer containing a moisture-permeable, waterproof film is provided at least on one surface of a substrate material and its moisture permeability by JIS L-1099 "Potassium Acetate Method" (B-1 method) being not less than $1 \times 10^3$ g/m²·24 h and not more than $50 \times 10^3$ g/m²·24 h. It is more preferable that the moisture permeability is not less than $8 \times 10^3$ g/m²·24 h and not more than $50 \times 10^3$ g/m²·24 h, having regard to comfortableness and wider applicability of the material.

"Film is provided at least on one surface of a substrate material" refers to that the film of this invention is laminated at least to one surface of a substrate material, and covers on one surface of the substrate material. The coating herein is preferably a coating on whole surface with a continuous coating layer, but it may be a discontinuous layer depending on its application purpose.

As the substrate material, a woven or knitted fabric, a non-woven fabric, a paper, a, porous film, a conventional moisture-permeable, waterproof material, a porous board, etc., are listed, but not limited thereto.

In order to coat the substrate material, a film forming method by casting or coating a pre-prepared resin solution over the substrate material, or laminating the substrate material with a pre-prepared film, is applied and the composite material of this invention can be obtained.

In order to make film structure porous, methods such as making discontinuous layer by decreasing film thickness, selectively coagulating by adding water soluble solvent in the coating liquid, adding water soluble material, etc., to the coating liquid to thereby dissolve it out after film formation can be adopted depending on its purpose.

In case of a coating, in general, a coating method such as knife-over-roll-coating, direct-roll-coating, reverse-roll-coating or gravure coating is carried out by properly controlling a coating amount so that a desired film thickness is attained.

Regarding heat set conditions, because a low temperature drying takes a long time and apt to bring about an insufficient crosslinking and a high temperature drying apt to bring about degradation of resin, it is preferable that the temperature condition is 80° C. to 180° C. and the treating time is 0.5 minute to 10 minutes.

In order to improve adherence between the substrate material and the resin, various publicly known methods can be applied. Methods such as a roughening surface of the substrate material, an undercoating or primer treatment can be applied depending on its purpose, but not limited thereto. In case of the undercoating or primer treatment, if a crosslinking agent such as block isocyanate is added in the treating agent, adherence is further improved because a crosslinking is formed between the resin layer and the substrate material after providing the coating liquid on the substrate material.

In case where a resin layer is prepared in advance and a lamination is carried out, thereafter, a resin liquid should be converted into a film on a release support and thereafter, a substrate material should be laminated with the film using an adhesive, etc. The release support, like a taffeta, a film or a paper, has a smooth surface with poor affinity to the resin film to be formed thereon. Usually, a release paper or film on which releasing agent such as silicone resin is coated or a release paper with laminated polypropylene, etc., is preferably used.

Regarding coating the release support with the resin liquid to thereby form a film, in general, by coating methods such as knife-over-roll-coating, direct-roll-coating, reverse-roll-coating, gravure coating, the release support may be coated under proper control of the coating amount so that a desired film thickness is attained, and a drying and a film-forming are carried out.

In order to make resin layer continuous, knife-coating is preferable, and by repeated coating and film-forming on a resin layer formed in advance, a laminated resin-layer can be formed.

The composite material of this invention which has moisture permeability and waterproofness can be obtained by selecting a substrate material and providing a resin layer on the substrate material according its end use and application.

In case where the resin layer needs to be colored, inorganic pigment or organic pigment, etc., may be properly added to the resin liquid.

In case where slipperiness needs to be improved, some method can be properly adopted, such as directly adding into the film inorganic particles such as of silica, titanium oxide, alumina or organic particles such as of polyurethane, acrylic resin, or imparting dotwise on the film surface a resin containing inorganic particles such as of silica, titanium oxide, alumina or organic particles such as of polyurethane, acrylic resin, to thereby make the surface uneven to thereby decrease abrasion area.

Furthermore, it is preferable that the moisture-permeable waterproof composite material of this invention has a retention ratio of water-resistant pressure of not less than 80% and not more than 100%. By keeping the retention ratio of water-resistant pressure together with the above mentioned moisture permeability and waterproofness, it becomes possible that the moisture-permeable waterproof composite material of this invention can be served to many applications.

In order to increase the retention ratio of water-resistant pressure, it is preferable that the composite material of this invention has two or more crosslinking structures in said resin layer. The crosslinking structure in the resin layer refers to that the resin polymer constituting the resin layer has a crosslinkable end functional group to crosslink each other or that the polymers crosslink each other by a crosslinking agent having crosslinkable end functional groups which coexists in the resin. The meaning that the composite material of this invention has two or more crosslinking structures is that there are two or more crosslinking structures of the above-stated crosslinkings.

Regarding the crosslinkable end functional group, isocyanate group, epoxy group, silanol group, methylol group, oxazoline group, etc., are listed, but not limited thereto.

Regarding a counter end group to be crosslinked with the crosslinkable end group, other than the same end group, hydroxyl group, amino group, carboxyl group, etc., are listed, but not limited thereto.

Having regard to the film strength, it is preferable that the crosslinkable end functional group has a structure capable of crosslinking with other polymers. For example, if the end group of the polymer has a structure such as hydroxyl group, amino group or carboxyl group, a polyisocyanate type compound can be preferably used, in particular, in order to increase film strength, a polyisocyanate of which main component is 4,4'-diphenylmethane diisocyanate, 4,4'-methylenebis(cyclohexyl isocyanate) can be preferably used. Among them, aqueous polyisocyanate compound of block type in which its functional group reactive with crosslinkable end functional group is blocked is preferable. Having regard to film-forming, dissociation temperature of the block structure is 80 to 180° C., more preferably, it is 100 to 140° C.

Having regard to increasing adhesiveness, as the crosslinkable end functional group, a structure crosslinkable with the polymer and with the substrate material can preferably be used, in particular, a compound having methylol group, for example, a crosslinking agent of methylolmelamine type can be preferably used.

Regarding the amount of crosslinking agent, although it may be determined by the total performance required in the composite material (moisture permeability, warer resistance, durability, etc.), in general, it is preferable that the amount is 0.1 to 10 wt %.

And, regarding the crosslinkable end functional group contained in the polymer, silanol group, etc., is preferable having regard to heat resistance, weather resistance and improving, softeness.

In view of these points, high moisture permeability, high water resistance and high retention ratio of water pressure resistance of the composite material are achieved by the combination of complementation between increasing moisture permeability by making polymer highly hydrophilic and high film strength of the hydrophobic polymer, and the best crosslinkings method.

Next, the manufacturing method of this invention is explained.

In this invention, it is preferable that, at providing, on a substrate material, a resin layer obtainable by removing solvent from the coating liquid containing a resin, the coating liquid is prepared so that an organic solvent content in the coating liquid is not less than 0 wt % and not more than 10 wt % based on the solid resin and a coating, a film-forming and a lamination to the substrate material are carried out.

Regarding the coating liquid used in this invention, the amount of the organic solvent is not less than 0 wt % and not more than 10 wt % based on the weight of the solid resin, preferably, not less than 0 wt % and not more than 3 wt %. By controlling the amount of the organic solvent, it becomes possible that discharge of organic solvent at film-forming process can be greatly decreased compared to conventional resin process with organic solvent, to thereby lighten load to the environment.

The organic solvent mentioned here is contained, as a solvent or a compatibilyzer of the resin or as an auxiliary for film-forming, in the coating liquid, and, as those solvent, aromatic compounds such as toluene, benzene, xylene, aliphatic compounds such as isopropanol, acetone, methylethylketone, N,N-dimethylformamide, N-methyl-2-pyrrolidone can be listed, but not limited thereto.

Regarding the amount of the organic solvent contained in the resin solution, it can be calculated from the weight of the solid resin contained in the resin solution and the weight of the organic solvent contained in the resin solution determined such as by gas chromatography or from the coating amount of the resin and the weight of the organic solvent generated up to reaching the coating amount.

And, the main component of the solvent other than the organic solvent is preferably water. By controlling the amount of water to be not less than 25 wt % and not more than 1900 wt % based on the weight of the solid resin, a good coating liquid can be prepared while keeping the amount of the organic solvent being not less than 0 wt % and not more than 10 wt %.

As mentioned above, regarding the resin of this invention, an aqueous resin can be preferably used.

Regarding the aqueous resin mentioned here, it is a forcibly emulsified resin in which an unemulsifiable or water insoluble resin is emulsified by, such as, a surface active agent, a self-emulsifiable resin in which a self-emulsifiable resin is emulsified or dispersed, or a water soluble resin in which a water soluble resin is dissolved, etc.

In this invention, the above mentioned film made from the resin which satisfies the above mentioned constitutions is made.

In this invention, having regard to the moisture permeability, water resistance and film strength, it is preferable that at least one of the resins is a self-emulsifiable resin or a water soluble resin in which the amount of surface active agent is low, more preferably, two self-emulsifiable resins, two water soluble resins or a blend resin of self-emulsifiable resin and a water soluble resin can be preferably used.

Self-emulsifiable refers to that the resin is in a dispersed condition having a particle size in the resin liquid. And, water soluble refers to that the resin is dissolved in which it has no particle size in the resin liquid.

Regarding the existence of the particle size, specifically, it can be determined as average particle diameter by light-scattering method using helium-neon light source. In case of an emulsifiable resin, it is not less than 10 nm and not more than 200 nm. Preferably, it is not less than 40 nm and not more than 100 nm. Similarly, in case of water soluble resin, the particle size is not less than 10 nm and not more than 200 nm, however, regarding the water soluble resin, this particle size is not detected.

In order to meet the constitutions of this invention and the resin be self-emulsifiable or water soluble, for example, in the molecular structure, an ionic dissociation group which is hydrophilic (for example, carboxyl group or its salt, sulfonic acid group or its salt, sulfonate group, carbamoylsulfonate group, quaternary amino group or quaternary ammonium salt, etc.), nonionic group (for example, polyoxyethylene group (for example, polyoxymethylene, polyoxyethylene group, etc.), epoxy group, etc.), etc., may be introduced, but not limited thereto.

Regarding the hydrophilic group, as mentioned above, anion group which is an ionic dissociation group is preferable, in particular, carboxyl group or its salt is preferable.

Having regard to film-forming property, it is preferable that the carboxyl group is a salt neutralized by an organic amine compound, for example, by triethylamine, etc. In this invention, a resin liquid in which dihydroxyalkyl aliphatic acid in the polymer is, in advance, neutralized and made aqueous such as by triethylamine can be preferably used.

EXAMPLES

Hereunder, this invention is explained specifically by examples.

The substrate materials, evaluation methods used in this invention are as follows.

| [substrate materials] | |
|---|---|
| (1) Nylon taffeta A | |
| Yarn usage | 77dtex-68 filaments (warp, weft) |
| Weave density | 116 × 88 yarns/cm |
| Weight | 72 g/m² |
| (2) Polyester taffeta A | |
| Yarn usage | 84dtex-72 filaments (warp, weft) |
| Weave density | 110 × 37/cm |
| Weight | 150 g/m² |
| (3) Nylon non-woven fabric | |
| Fiber thickness | 11 dtex/filament |
| Weight | 110 g/m² |
| (4) Polyethylene net | |
| Weight | 29 g/m² |
| Thickness | 0.12 mm |
| (5) Nylon taffeta B | |
| Yarn usage | 77dtex-68 filament yarn of nylon 6 |
| Weave density | warp: 92 yarns /in., weft: 36 yarns /in. |
| Weight | 45 g/m² |
| (6) Nylon taffeta C | |
| Yarn usage | 77dtex-68 filament yarn of nylon 6 |
| Weave density | warp: 183 yarns/in., weft: 130 yarns/in. |
| Weight | 110 g/m² |
| (7) Polyester taffeta B | |
| Yarn usage | 83dtex-36 filament yarn of polyethylene terephthalate |
| Weave density | warp: 98 yarns /in., weft: 84 yarns/in. |
| Weight | 70 g/m² |

The above substrate materials of (1)-(3) and (5)-(6) were subjected to a water repellent treatment which does not penetrates to the reverse surface (treated with a fluorine type water repellent agent AG925 (Asahi Glass Co., Ltd.) 4% aqueous dispersion), to hereby make water repellency level 3 or more after 20 times of home laundries and used. Regarding (2), the treating liquid in which 2 parts, based on the solid water repellent agent, of water soluble block isocyanate type crosslinking agent were added, was used.

[Moisture Permeability]
Measuered according to JIS L-1099 "Potassium Acetate Method" (B-1 method).

[Water Resistance]
Measuered according to JIS L-1092 "High Water Pressure Method".

In case of a film only, the water resistance is measured by the above method in a state in which the film is supported with a support so that the water pressure can be applied to the film surface.

[Retention Ratio of Water-Resistant Pressure]
Washer "CLOTHE WASHER" (type: LAT9206AAE) sold by MAYTAG Corp.)
Bath ratio 1:50

The water-resistant pressure was measured after 24 hours continuous washing with water without adding surface active agent and its percentage (%) to, the water-resistant pressure before washing is determined as the retention ratio of water-resistant pressure. However, if the water-resistant pressure was 0.3 MPa or more, 0.3 MPa was considered as the maximum value and the retention, ratio is calculated accordingly.

And, properties of resins used in some of the examples or comparative examples are as follows.

1. PE type PU
   Water-soluble polyether type polyurethane
   Main components: Polyethylene glycol, hydrogenated diphenylmethane diisocyanate
   Linear expansion coefficient of film when absorbed water: 60%
   Functional group having self-emulsification ability: Amine salt of carboxyl group
   Carboxyl-group content: 0.248 mmol/g 2. UA310
   Self-emulsifiable polycarbonate type polyurethane "PERMALIN UA310" (tradename of Sanyo Chemical Industries, Ltd.)
   Main composition: Polycarbonate diol, hydrogenated diphenylmethane diisocyanate
   Linear expansion coefficient of film when absorbed water: 1% or less
   Functional group having self-emulsification ability: Amine salt of carboxyl group
   Carboxyl-group content: 0.179 mmol/g 3. HMP17A
   Polyether type polyurethane of organic solvent type "SANPREN HMP17A" (tradename of Sanyo Chemical Industries, Ltd.)
   Linear expansion coefficient of film when absorbed water: 16%
   Functional group having self-emulsification ability: none
   Carboxyl-group content: None 4. D2060
   Self-emulsifiable polyether type polyurethane "RESAMINE D2060" (tradename of Dainichiseika Color & Chemicals Mfg. Co., Ltd.)
   Main component: polytetramethylene glycol, hydrogenated diphenylmethane diisocyanate
   Linear expansion coefficient of film when absorbed water: 1% or less
   Functional group-having self-emulsification ability: Amine salt of a carboxyl group
   Carboxyl-group content: 0.295 mmol/g 5. 107M
   Self-emulsifiable polyester type polyurethane "SUPERFLEX 107M" (tradename of Dai-Ichi Kogyo Seiyaku Co., Ltd.)
   Linear expansion coefficient of film when absorbed water: 3% or less
   Functional group having self-emulsification ability: Sodium salt of carboxyl group
   Carboxyl group content:—

6. 2770
   Self-emulsifiable acrylic polymer "VINYBLAN 2770" (tradename of Nissin Chemical Industry Co., Ltd.)
   Linear expansion coefficient of film when absorbed water: 1% or less Functional group having self-emulsification ability: Carboxyl group
Carboxyl group content:—

7. E-4000
Forcibly-emulsified polyether type polyurethane "SUPERFLEX E-4000" (tradename of Dai-Ichi Kogyo Seiyaku Co., Ltd.)
Linear expansion coefficient of film when absorbed water: 5%
Functional group having self-emulsification ability: None
Carboxyl group content:—

[Linear Expansion Coefficient of Film When Absorbed Water]

A resin film with a thickness of 50 micrometers having a mark of fixed space is immersed in 23° C. water and it is determined from expansion ratio of the fixed space of the marking after 24 hours.

[Film Strength]

Under the following conditions, the film strength oft film in dried condition was measured by "TENSILON UTM-100III" of Orientec Company, Ltd. The dried condition mentioned here refers to the condition in which a film prepared and heat treated (for example, at 50° C.-150° C. for 0.5 minute to 20 minutes) is left at 25° C., 65% humidity for at least 1 hour or more. Here, the heat treatment may be performed by dividing into multiple stages.

Sample, configuration: 8 cm×1 cm×50 micrometer
(Vertical×horizontal×thickness and measurement part is 5 cm×1 cm×50 micrometer)
Crosshead speed: 300 mm/min.

Example 1

A water soluble resin of which main component is a water soluble polyurethane containing silanol group as crosslinkable functional end group was synthesized by using 4,4'-methylenebis(cyclohexyl isocyanate) as polyisocyanate component and 0.248 mmol/g, based on the solid resin, of 2,2-bishydroxyalkyl methylpropionic acid as bishydroxyalkyl aliphatic acid, 67.2 wt %, based on the solid resin, of polyethylene glycol of number average molecular weight 1000 as polyalkylene glycol component. A blend resin of which solid content is 27 wt % was prepared by mixing the same amount of the above synthesized water soluble resin and "RESAMINE D2060" (tradename of Dainichiseika Color & Chemicals Mfg. Co., Ltd.), of which main component is a self-emulsifiable polyurethane synthesized by using 4,4'-methylenebis(cyclohexyl isocyanate) as an isocyanate component and 0.295 mmol/g, based on the solid resin, of 2,2-bishydroxymethylbutanoic acid as a bishydroxyalkyl aliphatic acid, polytetramethylene glycol of number average molecular weight 2000 as an alkylene-glycol component.

Bishydroxyalkyl aliphatic acid and polyethylene glycol contained in the blend resin were 0.256 mmol/g and 33.6 wt %, respectively.

A coating liquid was prepared by adding, as a crosslinking agent, 2 wt %, based on the solid blend resin, of "Sumitex resin M-3" (tradename of Sumitomo Chemitex Co., Ltd.) which is an melamine type crosslinking agent having methylol group as a functional end group, 5.6 wt % of "BN-69" (tradename of Daiich Kogyo Seiyaku) which is a block isocyanate type crosslinking agent having isocyanate group as a functional end group, and further, 10 wt %, based on the solid blend resin, a porous silica of average particle diameter of 2.7 micrometers as a lubricant for resin layer surface, followed by mixing with a mixer and defoaming.

Thus prepared coating liquid was coated on a polyester film by roll-on-knife method with a clearance of 0.1 mm. After the coating, with a hot air drier, it was dried at 140° C. for 2 minutes, further, heat treated at 160° C. for 2 minutes and after the film-forming, it was peeled off from the polyester film, subjected to aging for 48 hours at room temperature to obtain a film of this invention. The film thickness was 20 micrometers.

As shown in Tables 1 and 2, both of moisture permeability and water resistance were high and because it was made from an aqueous resin, compared to conventional process, it was an ecological moisture-permeable, waterproof film of low discharge of organic solvent.

Example 2

A water soluble resin of which main component is a water soluble polyurethane containing silanol group as crosslinkable functional end group was synthesized by using 4,4'-methylenebis(cyclohexyl isocyanate) as polyisocyanate component, 0.248 mmol/g, based on the solid resin, of 2,2-bishydroxyalkyl methylpropionic acid as bishydroxyalkyl aliphatic acid, 67.2 wt %, based on the solid resin, of polyethylene glycol of number average molecular weight 1000 as polyalkylene glycol component. A resin of which main component is a self-emulsifiable polyurethane was synthesized by using 4,4'-methylenebis(cyclohexyl isocyanate) as, polyisocyanate component, 0.295 mmol/g, based on the solid resin, 2,2-bishydroxymethylbutanoic acid as bishydroxyalkyl aliphatic acid, polytetramethylene glycol of number average molecular weight 2000 as an alkylene glycol component and hydrogenated xylylene diamine as an chain extender. A blend resin of which solid content is 27 wt % was prepared by blending the same amount of the above synthesized water soluble resin and the above synthesized resin of which main component is the self-emulsifiable polyurethane.

Bishydroxyalkyl aliphatic acid and polyethylene glycol contained in the solid blend resin were 0.256 mmol/g and 33.6 wt %, respectively.

A coating liquid was prepared by adding, as an crosslinking agent, 2 wt %, based on the solid blend resin, of "Sumitex Resin M-3" (tradename of Sumitomo Chemitex Co., Ltd.) which is an melamine type crosslinking agent having methylol group as a functional end group, 5.6 wt % of "BN-69" (tradename of Daiich Kogyo Seiyaku) which is an isocyanate type crosslinking agent having isocyanate group as a functional end group, and further, 10 wt %, based on the solid blend resin, a porous silica of average particle diameter of 2.7 micrometer as a lubricant of the resin layer surface, followed by mixing with a mixer and defoaming.

Thus prepared coating liquid was coated on a polyester film by roll-on-knife method with a clearance of 0.1 mm. After the coating, with a hot air drier, it was dried at 140° C. for 2 minutes, further, heat treated at 160° C. for 2 minutes and after the film-forming, it was peeled off from the polyester film, subjected to aging for 48 hours at room temperature to obtain a film of this invention. The film thickness was 20 micrometers.

As shown in Tables 1 and 2, both of moisture permeability and water resistance were high and because it was made from an aqueous resin, compared to conventional process, it was an ecological moisture-permeable, waterproof film of low discharge of organic solvent.

Example 3

A film of this invention was prepared by the same way as Example 1 except not adding the crosslinking agent. The film thickness was 20 micrometers.

As shown in Tables 1 and 2, both of moisture permeability and water resistance were high and because it was made from an aqueous resin, compared to conventional process, it was an ecological moisture-permeable, waterproof film of low discharge of organic solvent.

Example 4

Adjusting the solid resin content of the coating liquid of Example 1 to 8 wt %, the coating liquid was casted on a polyester film and, with a hot air drier, it was dried at 140° C. for 2 minutes, further, heat treated at 160° C. for 2 minutes and after the film-forming, it was peeled off from the polyester film, subjected to aging for 48 hours at room temperature to obtain a film of this invention. The film thickness was 20 micrometers.

As shown in Tables 1 and 2, both of moisture permeability and water resistance were high and because it was made from an aqueous resin, compared to conventional process, it was an ecological moisture-permeable, waterproof film of low discharge of organic solvent.

Example 5

A coating liquid was prepared by adding, as a cross linking agent, 2 wt %, based on the solid resin content of the "RESAMINE D2060", "Sumitex resin M-3" (tradename of Sumitomo Chemitex Co., Ltd.) which is a melamine type crosslinking agent having methylol group as its reactive terminal group, and further, 15 wt %, based on the solid blend resin, of a porous silica of average particle diameter of 2.7 micrometers as a lubricant of resin layer surface, followed by mixing with a mixer and defoaming.

Thus prepared coating liquid was coated dotwise on the film surface of the composite material obtained in Example 2 by a gravure roll with 0.8 mm dots of plover arrangement and it was dried at 120° C. for 1 minute, to thereby prepare a film of this invention.

As shown in Tables 1 and 2, both of moisture permeability and water resistance were high and because it was made from an aqueous resin, compared to conventional process, it was an ecological moisture-permeable, waterproof film of low discharge of organic solvent. And, it was a film having high slipperiness due to unevenness of its surface.

Example 6

A blend resin of 27.8 wt % solid content was prepared by blending the resin in which the self-emulsifiable resin is the main component which is synthesized from 4,4'-methylenebis(cyclohexyl isocyanate) as polyisocyanate component, 0.213 mmol/g, based on the solid resin, of 2,2-bishydroxyalkyl methylpropionic acid as bishydroxyalkyl aliphatic acid, polyhexamethylene carbonate containing polyhexamethylene glycol of number average molecular weight 1000 as polyalkylene glycol component and hydrogenated xylylene diamine as an chain extender, and the water-soluble polyurethane resin of Example 1 were blended so that the respective solid wt % was 30:70. Except using this resin, a film of this invention was prepared in the same way as Example 5.

Bishydroxyalkyl aliphatic acid and polyethylene glycol, contained in the solid content of the blend resin were 0.224 mmol/g and 47.0 wt %, respectively.

As shown in Tables 1 and 2, both of moisture permeability and water resistance were high and because it was made from an aqueous resin, compared to conventional process, it was an ecological moisture-permeable, waterproof film of low discharge of organic solvent.

Example 7

A film of this invention was prepared in the same way as Example 1 except blending same wt % of "PERMALIN UA310" (tradename of Sanyo Chemical Industries, Ltd.) which is a polyurethane type resin containing, based on the solid resin, 0.179 mmol/g of bishydroxyalkyl aliphatic acid and the water soluble blend resin of Example 1.

Bishydroxyalkyl aliphatic acid and polyethylene glycol contained in the solid content of the blend resin were 0.213 mmol/g and 33.6 wt %, respectively.

As shown in Tables 1 and 2, both of moisture permeability and water resistance were high and because it was made from an aqueous resin, compared to conventional process, it was an ecological moisture-permeable, waterproof film of low discharge of organic solvent.

Example 8

A composite material of this invention was prepared in the same way as Example 1 except changing the clearance to 0.15 mm and laminating the film obtained to nylon taffeta A.

As shown in Tables 1 and 2, both of moisture permeability and water resistance were high and because it was made from an aqueous resin, compared to conventional process, it was an ecological moisture-permeable, waterproof composite material of low discharge of organic solvent.

Example 9

A composite material of this invention was prepared in the same way as Example 8 except using polyester taffets A.

As shown in Tables 1 and 2, both of moisture permeability and water resistance were high and because it was made from an aqueous resin, compared to conventional process, it was an ecological moisture-permeable, waterproof composite material of low discharge of organic solvent.

Example 10

A composite material of this invention was prepared in the same way as Example 8 except using nylon non-woven fabric.

As shown in Tables 1 and 2, both of moisture permeability and water resistance were high and because it was made from an aqueous resin, compared to conventional process, it was an ecological moisture-permeable, waterproof composite material of low discharge of organic solvent.

Example 11

A composite material of this invention was prepared in the same way as Example 8 except using polyethylene net "DEL-NETP-620W" (tradename of Sansho Co., Ltd.).

As shown in Tables 3 and 4, both of moisture permeability and water resistance were high and because it was made from an aqueous resin, compared to conventional process, it was an ecological moisture-permeable, waterproof composite material of low discharge of organic solvent.

Example 12

A composite material of this invention was prepared in the same way as Example 8 except coating was carried out by floating-knife-method with a clearance of 0 mm.

As shown in Tables 3 and 4, both of moisture permeability and water resistance were high and because it was made from an aqueous resin, compared to conventional process, it was an ecological moisture-permeable, waterproof composite material of low discharge of organic solvent.

Example 13

The self-emulsifiable resin and the water-soluble polyurethane resin used in Example 1 were blended so that the respective solid wt % was 30:70, then, 20 wt %, based on the solid blend resin, of "TAKENATE WD725" (tradename of Mitsui Takeda Chemicals Inc.) which is a water-soluble isocyanate was added to the blend resin, followed by mixing with a mixer and defoaming to prepare an adhesive.

Thus prepared coating liquid was coated on the film obtained in Example 1 by a gravure roll of 150 mesh so that the coating amount was 8 $g/m^2$ and the coated layer was pre-dried at 80° C. for 1 minute.

The pre-dried film was laminated to nylon taffeta A which had not been treated by water repellent agent, heat-pressed at 120° C. at linear load of 2 kg/cm, and after the heat-pressure-bonding, a composite material of this invention was obtained by peeling off the release film from the substrate material and subjected to aging for 48 hours at room temperature.

As shown in Tables 3 and 4, both of moisture permeability and water resistance were high and because it was made from an aqueous resin, compared to conventional process, it was an ecological moisture-permeable, waterproof composite material of low discharge of organic solvent.

Example 14

A moisture-permeable, waterproof composite material was prepared in the same way as Example 8 except using a organic solvent type polyurethane porous film made by wet-coagulation having a moisture permeability by JIS L-1099 "Potassium Acetate Method" (B-1 method) of $1.4 \times 10^3$ $g/m^2 \cdot 24$ h and a water-resistant pressure by JIS L-1092 "High Water Pressure Method" of 0.23 MPa as a functional film and nylon taffets A as substrate fabric.

As shown in Tables 3 and 4, both of moisture permeability and water resistance were high and because it was made from an aqueous resin, compared to conventional process, it was an ecological moisture-permeable, waterproof composite material of low discharge of organic solvent.

Example 15

A moisture-permeable, waterproof composite material was prepared in the same way as Example 8 except using a polyurethane porous film consisting of an aqueous resin made by dissolving out method, which has a moisture permeability by JIS L-1099 "Potassium Acetate Method" (B-1 method) of $1.2 \times 10^3$ $g/m^2 \cdot 24$ h and a water-resistant pressure by JIS L-1092 "High Water Pressure Method" of 0.07 MPa as a functional film and nylon taffeta A as substrate fabric.

As shown in Tables 3 and 4, both of moisture permeability and water resistance were high and because it was made from an aqueous resin, compared to conventional process, it was an ecological moisture-permeable, waterproof composite material of low discharge of organic solvent.

Example 16

A composite material of this invention was prepared in the same way as Example 8 except adding, as crosslinking agent, 2 wt % of an oxazoline type crosslinking agent having oxazoline group "EPOCROS WS 700" (tradename of Nippon Shokubai Co., Ltd.) instead of adding the block isocyanate type cross linking agent "BN-69" (tradename of Dai-ichi Koguo Seiyaku Co., Ltd.).

As shown in Tables 3 and 4, both of moisture permeability and water resistance were high and because it was made from an aqueous resin, compared to conventional process, it was an ecological moisture-permeable, waterproof composite material of low discharge of organic solvent.

Example 17

A composite material of this invention was prepared in the same way as Example 8 except replacing "Sumitex resin M-3" (tradename of Sumitomo Chemitex Co., Ltd.) which is an melamine type crosslinking agent having methylol group with 2 wt % of an epoxy type crosslinking agent having an epoxy group "DENAKORU 313" (tradename of Nagase ChemteX Corp.).

As shown in Tables 3 and 4, both of moisture permeability and water resistance were high and because it was made from an aqueous resin, compared to conventional process, it was an ecological moisture-permeable, waterproof composite material of low discharge of organic solvent.

Example 18

A composite material of this invention was prepared in the same way as Example 5 by preparing a coating liquid in which the self-emulsifiable resin was replaced with a polyester type resin "Vilonal MD-1985" (tradename of Toyobo. Co., Ltd.) so that its solid weight was the same as that of the water soluble polyurethane.

Bishydroxyalkyl aliphatic acid and polyethylene glycol contained in the solid blend resin were 0.151 mmol/g and 33.6 wt %, respectively.

As shown in Tables 3 and 4, both of moisture permeability and water resistance were high and because it was made from an aqueous resin, compared to conventional process, it was an ecological moisture-permeable, waterproof composite material of low discharge of organic solvent.

Example 19

A composite material of this invention was prepared in the same way as Example 5 by preparing a coating liquid in which the self-emulsifiable resin was replaced with a silicone type resin "BY 22-826" (tradename of Toray Industries Dow Jones coning silicone corporation.) so that its solid weight was the same as that of the water soluble polyurethane.

As shown in Tables 3 and 4, both of moisture permeability and water resistance were high and because it was made from an aqueous resin, compared to conventional process, it was an ecological moisture-permeable, waterproof composite material of low discharge of organic solvent.

Example 20

A composite material of this invention was prepared in the same way as Example 5 by preparing a coating liquid in which the self-emulsifiable resin was replaced with an acrylic type resin "Voncoat 350" (tradename of Dainippon Ink and Chemicals, Inc.) so that its solid weight was the same as that of the water soluble polyurethane.

As shown in Tables 3 and 4, both of moisture permeability and water resistance were high and because it was made from an aqueous resin, compared to conventional process, it was an ecological moisture-permeable, waterproof composite material of low discharge of organic solvent.

Example 21

By using the water-soluble polyurethane of Example 1 alone, a composite material of this invention was prepared in the same way as Example 8.

As shown in Tables 3 and 4, moisture permeability was high and because it was made from an aqueous resin, compared to conventional process, it was an ecological moisture-permeable, waterproof composite material of low discharge of organic solvent.

Example 22

Undiluted liquid of "D2060" 16.7 parts, 15 wt % of aqueous solution of PE type PU 33.3 parts and undiluted liquid of an oxazoline type crosslinking agent "EPOCROS WS 700" (tradename of Nippon Shokubai Co., Ltd.; oxazoline equivalent 4.5 mmol/g) 0.5 parts were mixed to prepare a resin liquid and it was coated on a release paper to which a polypropylene film is laminated and heat treated in an oven at 140° C. for 2 minutes, to thereby prepare a film of this invention (film thickness 50 micrometers). The weight ratio of organic solvent to solid resin in the resin liquid was 1% or less.

It was a moisture-permeable, waterproof film of low environmental load having moisture permeability of 80,000 g/m$^2$·24 h and film strength of 12 MPa in which moisture permeability and film strength are compatible.

Example 23

A moisture-permeable waterproof composite material of this invention was prepared by the same way as Example 22 except using nylon taffeta A as a substrate material and coating and film-forming were carried out with a clearance of 0.15 mm.

The moisture permeability was 19,000 g/m$^2$·24 h and the water pressure resistance was 0.30 MPa and it was a moisture-permeable waterproof composite material of low environmental load having high moisture permeability.

Example 24

A moisture-permeable, waterproof film of this invention (film thickness 50 micrometers) was prepared by the same way as Example 22 except using a resin liquid in which undiluted liquid of "D2060" 16.7 parts, 15 wt % of aqueous solution of PE type PU 33.3 parts, undiluted liquid of methylol melamine resin "Sumitex resin M-3" (tradename of Sumitomo Chemitex Co., Ltd.) 0.25 part and undiluted liquid of an amine type catalyst "Sumitex accelerator ACX" (tradename of Sumitomo Chemitex Co., Ltd.) 0.03 part were mixed. The weight ratio of organic solvent to solid resin in the resin liquid was 1% or less.

It was a moisture-permeable, waterproof film of low environmental load having moisture permeability of 42,000 g/m$^2$·24 h and film strength of 13 MPa in which moisture permeability and film strength are compatible.

Example 25

A moisture-permeable waterproof composite material of this invention was prepared by the same way as Example 22 except using nylon taffeta A as a substrate material and coating and film-forming were carried out with a clearance of 0.15 mm.

The moisture permeability was 14,000 g/m$^2$·24 h and the water pressure resistance was 0.60 MPa and it was a moisture-permeable waterproof composite material of low environmental load having high moisture permeability.

Example 26

A moisture-permeable, waterproof film of this invention (film thickness 50 micrometers) was prepared by the same way as Example 22 except using a resin liquid in which undiluted liquid of "D2060" 16.7 parts, 15 wt % of aqueous solution of PE type PU 33.3 parts, undiluted liquid of a water-soluble isocyanate "TAKENATE WD725" (tradename of Mitsui Takeda Chemicals Inc.) 0.2 part were mixed. The weight ratio of organic solvent to solid resin in the resin liquid was 1% or less.

It was a moisture-permeable, waterproof film of low environmental load having moisture permeability of 42,000 g/m$^2$·24 h and film strength of 13 MPa in which moisture permeability and film strength are compatible.

Example 27

A moisture-permeable waterproof composite material of this invention was prepared by the same, way as Example 22 except using nylon taffeta A as a substrate material and coating and film-forming were carried out with a clearance of 0.15 mm.

The moisture permeability was 14,000 g/m$^2$·24 h and the water pressure resistance was 0.39 MPa and it was a moisture-permeable waterproof composite material of low environmental load having high moisture permeability.

Example 28

A moisture-permeable, waterproof film of this invention (film thickness 50 micrometers) was prepared by the same way as Example 22 except using a resin liquid in which undiluted liquid of "D2060" 16.7 parts, 15 wt % of aqueous solution of PE type PU 33.3 parts, undiluted liquid of a carbodiimide type compound "Carbodilite E04" (tradename of Nissinbo Industries, Inc.) 0.5 part were mixed. The weight ratio of organic solvent to solid resin in the resin liquid was 1% or less, It was a moisture-permeable, waterproof film of low environmental load having moisture permeability of 40,000 g/m$^2$·24 h and film strength of 12 MPa in which moisture permeability and film strength are compatible.

Example 29

A moisture-permeable waterproof composite material of this invention was prepared by the same way as Example 22 except using nylon taffeta A as a substrate material and coating and film-forming were carried out with a clearance of 0.15 mm.

The moisture permeability was 13,000 g/m$^2$·24 h and the water pressure resistance was 0.36 MPa and it was a moisture-permeable waterproof composite material of low environmental load having a high moisture permeability.

Example 30

A moisture-permeable, waterproof film of this invention (film thickness 50 micrometers) was prepared by the same way as Example 22 except using a resin liquid in which undiluted liquid of "D2060" 16.7 parts, 15 wt % of aqueous solution of PE type PU 33.3 parts, undiluted liquid of an epoxy compound "DENAKORU EX810" (tradename of Nagase ChemteX Corp.) 0.2 part were mixed. The weight ratio of organic solvent to solid resin in the resin liquid was 1% or less.

It was a moisture-permeable, waterproof film of low environmental load having moisture permeability of 39,000 g/m$^2$·24 h and film strength of 10 MPa in which moisture permeability and film strength are compatible.

Example 31

A moisture-permeable waterproof composite material of this invention was prepared by the same way as Example 22 except using nylon-taffeta A as a substrate material and coating and film-forming were carried out with a clearance of 0.15 mm.

The moisture permeability was 12,000 g/m$^2$·24 h and the water pressure resistance was 0.32 MPa and it was a moisture-permeable waterproof composite material of low environmental load having a high moisture permeability.

Example 32

A moisture-permeable, waterproof film of this invention (film thickness 50 micrometers) was prepared by the same way as Example 22 except without adding the crosslinking agent. The weight ratio of organic solvent to solid resin in the resin liquid was 1% or less.

It was a moisture-permeable, waterproof film of low environmental load having moisture permeability of 16,000 g/m$^2$·24 h and film strength of 11 MPa in which moisture permeability and film strength are compatible.

Example 33

A moisture-permeable waterproof composite material of this invention was prepared by the same way as Example 22 except using nylon taffeta A as a substrate material and coating and film-forming were carried out with a clearance of 0.15 mm.

The moisture permeability was 8,500 g/m$^2$·24 h and the water pressure resistance was 0.15 MPa and it was a moisture-permeable waterproof composite material of low environmental load having a high moisture permeability.

Example 34

Undiluted liquid of "UA310" 12.5 parts, 15 wt % of aqueous solution of PE type PU 33.3 parts and undiluted liquid of an oxazoline type croslinking agent. "EPOCROS WS 500" (tradename of Nippon Shokubai Co., Ltd., oxazoline equivalent 4.5 mmol/g) 0.25 part were mixed and the mixed liquid was coated and, in an oven, heat treated at 140° C. for 10 minutes after drying at 80° C. for 15 minutes, and thereby prepared a moisture-permeable, waterproof film of this invention (film thickness 50 micrometers). The weight ratio of organic solvent to solid resin in the resin liquid was more than 10 wt %.

It was a moisture-permeable, waterproof film of low environmental load having moisture permeability of 71,000 g/m2·24 h and film strength of 13 MPa in which moisture permeability and film strength are compatible.

Example 35

A moisture-permeable waterproof composite material of this invention was prepared by the same way as Example 34 except using nylon taffeta A as a substrate material and coating and film-forming were carried out with a clearance of 0.15 mm.

The moisture permeability was 21,000 g/m$^2$·24 h and the water pressure resistance was 0.27 MPa and it was a moisture-permeable waterproof composite material of low environmental load having a high moisture permeability.

Example 36

A moisture-permeable, waterproof film of this invention (film thickness 50 micrometers) was prepared by the same way as Example 34 except using a rein liquid in which undiluted liquid of "UA310" 12.5 parts, 15 wt % of aqueous solution of PE type PU 33.3 parts and undiluted liquid of an oxazoline type croslinking agent "EPOCROS WS 500" (tradename of Nippon Shokubai Co., Ltd.; oxazoline equivalent 4.5 mmol/g) 0.5 part were mixed. The weight ratio of organic solvent to solid resin in the resin liquid was more than 10 wt %.

It was a moisture-permeable, waterproof film of low environmental load having moisture permeability of 77,000 g/m2·24 h and film strength of 14 MPa in which moisture permeability and film strength are compatible.

Example 37

A moisture-permeable waterproof composite material of this invention was prepared by the same way as Example 34 except using nylon taffeta A as a substrate material and coating and film-forming were carried out with a clearance of 0.15 mm.

The moisture permeability was 22,000 g/m$^2$·24 h and the water pressure resistance was 0.21 MPa and it was a moisture-permeable waterproof composite material of low environmental load having a high moisture permeability.

Example 38

A moisture-permeable, waterproof film of this invention (film thickness 50 micrometers) was prepared by the same way as Example 34 except using a rein liquid in which undiluted liquid of "UA310" 12.5 parts, 15 wt % of aqueous solution of PE type PU 33.3 parts and undiluted liquid of an oxazoline type croslinking agent "EPOCROS WS 500" (tradename, of Nippon Shokubai Co., Ltd.; oxazoline equivalent 4.5 mmol/g) 2.5 part were mixed. The weight ratio of organic solvent to solid resin in the resin liquid was more than 10 wt %.

It was a moisture-permeable, waterproof film of low environmental load having moisture permeability of 50,000

Example 39

A moisture-permeable waterproof composite material of this invention was prepared by the same way as Example 34 except using nylon taffeta A as a substrate material and coating and film-forming were carried out with a clearance of 0.15 mm.

The moisture permeability was 18,000 g/m$^2$·24 h and the water pressure resistance was 0.25 MPa and it was a moisture-permeable waterproof composite material of low environmental load having a high moisture permeability.

Example 40

A moisture-permeable, waterproof film of this invention (film thickness 50 micrometers) was prepared by the same way as Example 34 except using a rein liquid in which undiluted liquid of "UA310" 12.5 parts, 15 wt % of aqueous solution of PE type PU 33.3 parts, undiluted liquid of a methylol melamine resin "Sumitex resin M-3" (tradename of Sumitomo Chemitex Co., Ltd.) 0.25 part and undiluted liquid of an amine type catalyst "Sumitex accelerator ACX" (tradename of Sumitomo Chemitex Co., Ltd.) 0.03 part were mixed. The weight ratio of organic solvent to solid resin in the resin liquid was more than 10 wt %.

It was a moisture-permeable, waterproof film of low environmental load having moisture permeability of 39,000 g/m2·24 h and film strength of 16 MPa in which moisture permeability and film strength are compatible.

Example 41

A moisture-permeable waterproof composite material of this invention was prepared by the same way as Example 34 except using nylon taffeta A as a substrate material and coating and film-forming were carried out with a clearance of 0.15 mm.

The moisture permeability was 14,000 g/m$^2$·24 h and the water pressure resistance was 0.51 MPa and it was a moisture-permeable waterproof composite material of low environmental load having a high moisture permeability.

Example 42

A moisture-permeable, waterproof film of this invention (film thickness 50 micrometers) was prepared by the same way as Example 34 except using a rein liquid in which undiluted liquid of "UA310" 12.5 parts, 15 wt % of aqueous solution of PE type PU 33.3 parts, undiluted liquid of a water-soluble isocyanate "TAKENATE WD725" (tradename of Mitsui Takeda Chemicals Inc.) were mixed. The weight ratio of organic solvent to solid resin in the resin liquid was more than 10 wt %.

It was a moisture-permeable, waterproof film of low environmental load having moisture permeability of 38,000 g/m2·24 h and film strength of 15 MPa in which moisture permeability and film strength are compatible.

Example 43

A moisture-permeable waterproof composite material of this invention was prepared by the same way as Example 34 except using nylon taffeta A as a substrate material and coating and film-forming were carried out with a clearance of 0.15 mm.

The moisture permeability was 14,000 g/m$^2$·24 h and the water pressure resistance was 0.46 MPa and it was a moisture-permeable waterproof composite material of low environmental load having a high moisture permeability.

Example 44

A moisture-permeable, waterproof film of this invention (film thickness 50 micrometers) was prepared by the same way as Example 34 except using a rein liquid in which undiluted liquid of "UA310" 12.5 parts, 15 wt % of aqueous solution of PE type PU 33.3 parts, undiluted liquid of a carbodiimide type compound "Carbodilite E04" (tradename of Nissinbo Industries, Inc.) 0.5 part were mixed. The weight ratio of organic solvent to solid resin in the resin liquid was more than 10 wt %.

It was a moisture-permeable, waterproof film of low environmental load having moisture permeability of 43,000 g/m2·24 h and film strength of 13 MPa in which moisture permeability and film strength are compatible.

Example 45

A moisture-permeable waterproof composite material of this invention was prepared by the same way as Example 34 except using nylon taffeta A as a substrate material and coating and film-forming were carried out with a clearance of 0.15 mm.

The moisture permeability was 13,000 g/m$^2$·24 h and the water pressure resistance was 0.34 MPa and it was a moisture-permeable waterproof composite material of low environmental load having a high moisture permeability.

Example 46

A moisture-permeable, waterproof film of this invention (film thickness 50 micrometers) was prepared by the same way as Example 34 except using a rein liquid in which undiluted liquid of "UA310" 12.5 parts, 15 wt % of aqueous solution of PE type PU 33.3 parts, undiluted liquid of an epoxy compound "DENAKORU EX810" (tradename of Nagase ChemteX Corp.) 0.2 part were mixed. The weight ratio of organic solvent to solid resin in the resin liquid was more than 10 wt %.

It was a moisture-permeable, waterproof film of low environmental load having moisture permeability of 35,000 g/m2·24 h and film strength of 14 MPa in which moisture permeability and film strength are compatible.

Example 47

A moisture-permeable waterproof composite material of this invention was prepared by the same way as Example 34 except using nylon taffeta A as a substrate material and coating and film-forming were carried out with a clearance of 0.15 mm.

The moisture permeability was 12,000 g/m$^2$·24 h and the water pressure resistance was 0.35 MPa and it was a moisture-permeable waterproof composite material of low environmental load having a high moisture permeability.

Example 48

A moisture-permeable, waterproof film of this invention (film thickness 50 micrometers) was prepared by the same way as Example 34 except using a rein liquid in which undiluted liquid of "UA310" 12.5 parts, 15 wt % of: aqueous solution of PE type PU 33.3 parts were mixed. The weight ratio of organic solvent to solid resin in the resin liquid was more than 10 wt %.

It was a moisture-permeable, waterproof film of low environmental load having moisture permeability of 14,000 g/m2·24 h and film strength of 12 MPa in which moisture permeability and film strength are compatible.

Example 49

A moisture-permeable waterproof composite material of this invention was prepared by the same way as Example 34 except using nylon taffeta A as a substrate material and coating and film-forming were carried out with a clearance of 0.15 mm.

The moisture permeability was 8,500 g/m$^2$·24 h and the water pressure resistance was 0.12 MPa and it was a moisture-permeable waterproof composite material of low environmental load having a high moisture permeability.

Example 50

A moisture-permeable, waterproof film of this invention (film thickness 50 micrometers) was prepared by the same way as Example 34 except using a rein liquid in which 15 wt % of aqueous solution of PE type PU 33.3 parts and undiluted liquid of an oxazoline type croslinking agent "EPOCROS WS 500" (tradename of Nippon Shokubai Co., Ltd.; oxazoline equivalent 4.5 mmol/g) 0.5 part were mixed. The weight ratio of organic solvent to solid resin in the resin liquid was 1% or less.

It was a moisture-permeable, waterproof film of low environmental load having moisture permeability of 180,000 g/m2·24 h and film strength of 2 MPa in which moisture permeability and film strength are compatible.

Example 51

A moisture-permeable waterproof composite material of this invention was prepared by the same way as Example 34 except using nylon taffeta A as a substrate material and coating and film-forming were carried out with a clearance of 0.15 mm.

The moisture permeability was 29,000 g/m$^{2\cdot24}$ h and the water, pressure resistance was 0.09 MPa and it, was a moisture-permeable waterproof composite material of low environmental load having a high moisture permeability.

Example 52

20 wt % of aqueous solution of PE type PU was coated on a release paper to which a polypropylene film was laminated and, in an oven, heat treated at 140° C. for 10 minutes after drying at 80° C. for 15 minutes, thereby a film of this invention was prepared. The weight ratio of organic solvent to solid resin in the resin liquid was 1% or less.

It was, a moisture-permeable, waterproof film of low environmental load having moisture permeability of 170,000 g/m2·24 h and film strength of 1 MPa in which moisture permeability and film strength are compatible.

Example 53

A moisture-permeable waterproof composite material of this invention was prepared by the same way as Example 52 except using nylon taffeta A as a substrate material and coating and film-forming were carried out with a clearance of 0.15 mm.

The moisture permeability was 27,000 g/m$^2$·24 h and the water pressure resistance was 0.05 MPa and it was a moisture-permeable waterproof composite material of low environmental load having a high moisture permeability.

Example 54

Undiluted liquid of "107M" 20 parts and 15 wt % aqueous solution of PE-type PU 33.3 parts were mixed and the mixed liquid was coated on a release paper to which a polypropylene film was laminated and heat treated in an oven at 140° C. for 10 minutes, thereby a moisture-permeable, waterproof film (film thickness 50 micrometers) of this invention was prepared. The weight ratio of organic solvent to solid resin in the resin liquid was more than 10 wt %.

It was a moisture-permeable, waterproof film of low environmental load-having moisture permeability of 13,000 g/m2·24 h and film strength of 10 MPa in which moisture permeability and film strength are compatible.

Example 55

A moisture-permeable waterproof composite material of this invention was prepared by the same way as Example 54 except using nylon taffeta A as a substrate material and coating and film-forming were carried out with a clearance of 0.15 mm.

The moisture permeability was 8,100 g/m$^2$·24 h and the water pressure resistance was 0.13 MPa and it was a moisture-permeable waterproof composite material of low environmental load having a high moisture permeability.

Example 56

A moisture-permeable, waterproof film of this invention (film thickness 50 micrometers) was prepared by the same way as Example 54 except using a rein liquid in which undiluted liquid of "107M" 20 parts, 15 wt % of aqueous solution of PE type PU 33.3 parts and undiluted liquid of an oxazoline type croslinking agent "EPOCROS WS 700" (tradename of Nippon Shokubai Co., Ltd.; oxazoline equivalent 4.5 mmol/g) 0.5 part were mixed. The weight, ratio of organic solvent to solid resin in the resin liquid was more than 10%.

It was a moisture-permeable, waterproof film of low environmental load having moisture permeability of 45,000 g/m2·24 h and film strength of 10 MPa in which moisture permeability and film strength are compatible.

Example 57

A moisture-permeable waterproof composite material of this invention was prepared by the same way as Example 54 except using nylon taffeta A as a substrate-material and coating and film-forming were carried out with a clearance of 0.15 mm.

The moisture permeability was 12,000 g/m$^2$·24 h and the water pressure resistance was 0.23 MPa and it was a moisture-permeable waterproof composite material of low environmental load having a high moisture permeability.

Example 58

A moisture-permeable, waterproof film of this invention (film thickness 50 micrometers) was prepared by the same way as Example 54 except using a rein liquid in which undiluted liquid of "2770" 10 parts and 15 wt % of aqueous solution of PE type PU 33.3 parts were mixed. The weight ratio of organic solvent to solid resin in the resin liquid was more than 10 wt %.

It was a moisture-permeable, waterproof film of low environmental load having moisture permeability of 11,000 g/m2·24 h and film strength of 3 MPa in which moisture permeability and film strength are compatible.

Example 59

A moisture-permeable waterproof composite material of this invention was prepared by the same way as Example 58 except using nylon taffeta A as a substrate material and coating and film-forming were carried out with a clearance of 0.15 mm.

The moisture permeability was 8,000 g/m$^2$·24 h and the water pressure resistance was 0.15 MPa and it was a moisture-permeable waterproof composite material of low environmental load having a high moisture permeability.

Example 60

A moisture-permeable, waterproof film of this invention (film thickness 50 micrometers) was prepared by the same way as Example 54 except using a rein liquid in which undiluted liquid of "2770" 10 parts, 15 wt % of aqueous solution of PE type PU 33.3 parts and undiluted liquid of an oxazoline type croslinking agent "EPOCROS WS 700" (tradename of Nippon Shokubai Co., Ltd.; oxazoline equivalent 4.5 mmol/g) 0.5 part were mixed. The weight ratio of organic solvent to solid resin in the resin liquid was more than 10 wt %.

It was a moisture-permeable, waterproof film of low environmental load having moisture permeability of 38,000 g/m2·24 h and film strength of 4 MPa in which moisture permeability and film strength are compatible.

Example 61

A moisture-permeable waterproof composite material of this invention was prepared by the same way as Example 60 except using nylon taffeta A as a substrate material and coating and film-forming were carried out with a clearance of 0.15 mm.

The moisture permeability was 11,000 g/m$^2$·24 h and the water pressure resistance was 0.26 MPa and it was a moisture-permeable waterproof composite material of low environmental load having a high moisture permeability.

Example 62

A moisture-permeable, waterproof film of this invention (film thickness 50 micrometers) was prepared by, the same way as Example 54 except using a rein liquid in which undiluted liquid of "E-4000" 11.1 parts and 15 wt % of aqueous solution of PE type PU 33.3 parts were mixed. The weight ratio of organic solvent to solid resin in the resin liquid was more than 10 wt %.

It was a moisture-permeable, waterproof film of low environmental load having moisture permeability of 15,000 g/m2·24 h and film strength of 13 MPa in which moisture permeability and film strength are compatible.

Example 63

A moisture-permeable waterproof composite material of this invention was prepared by the same way as Example 62 except using nylon taffeta A as a substrate material and coating and film-forming were carried out with a clearance of 0.15 mm.

The moisture permeability was 8,800 g/m$^2$·24 h and the water pressure resistance was 0.09 MPa and it was a moisture-permeable waterproof composite material of low environmental load having a high moisture permeability.

Example 64

A moisture-permeable, waterproof film of this invention (film thickness 50 micrometers) was prepared by the same way as Example 54 except using a rein liquid in which undiluted liquid of "E-4000" 11.1 parts, 15 wt % of aqueous solution of PE type PU 33.3 parts, undiluted liquid of a methylol melamine resin "Sumitex resin M-3" (tradename made of Sumitomo Chemitex Co., Ltd.) 0.25 part and undiluted liquid of an amine type catalyst "Sumitex accelerator ACX" (tradename of Sumitomo Chemitex Co., Ltd.) 0.03 part were mixed. The weight ratio of organic solvent to solid resin in the resin liquid was more than 10 wt %.

It was a moisture-permeable, waterproof film of low environmental load having moisture permeability of 22,000 g/m2·24 h and film strength of 12 MPa in which moisture permeability and film strength are compatible.

Example 65

A moisture-permeable waterproof of composite material of this invention was prepared by the same way as Example 64 except using nylon taffeta A as a substrate material and coating and film-forming were carried out with a clearance of 0.15 mm.

The moisture permeability was 9,600 g/m$^2$·24 h and the water pressure resistance was 0.26 MPa and it was a moisture-permeable waterproof composite material of low environmental: load having a high moisture permeability.

Example 66

Undiluted aqueous adhesive "Voncoat ES141" (tradename of Dainippon Ink and Chemicals, Inc.) was coated on Nylon taffeta A using a gravure roll of 150 meshes, pre-dried, pressure-bonded to the film obtained in Example 22, heat treated at 120° C. for 5 minutes and then, aged at room temperature for more than 24 hours, thereby a moisture-permeable waterproof composite material of this invention was obtained.

It was a moisture-permeable waterproof composite material of low environmental load having moisture permeability of 17,000 g/m$^2$·24 h and water pressure resistance of 0.27 MPa in which moisture permeability and film strength are compatible.

Example 67

A moisture-permeable waterproof composite material of this invention was prepared in the same way of Example 66 except using the film obtained in Example 32.

It was a moisture-permeable, waterproof film of low environmental load having moisture permeability of 3,100 g/m$^2$·24 h and water pressure resistance of 0.30 MPa in which moisture permeability and water pressure resistance are compatible.

Example 68

A moisture-permeable waterproof composite material of this invention was prepared in the same way of Example 66 except using the film obtained in Example 40.

It was a moisture-permeable, waterproof film of low environmental load having moisture permeability of 14,000 g/m2·24 h and water pressure resistance of 0.41 MPa in which moisture permeability and water pressure resistance are compatible.

Example 69

A moisture-permeable waterproof composite material of this invention was prepared in the same way of Example 66 except using the film obtained in Example 42.

It was a moisture-permeable, waterproof film of low environmental load having moisture permeability of 14,000 g/m2·24 h and water pressure resistance of 0.38 MPa in which moisture permeability and water pressure resistance are compatible.

Example 70

A moisture-permeable waterproof composite material of this invention was prepared in the same way of Example 66 except using the film obtained in Example 52.

It was a composite material of low environmental load having moisture permeability of 22,000 g/m²·24 h and water pressure resistance of 0.11 MPa in which moisture permeability and water pressure resistance are compatible.

Example 71

Undiluted aqueous adhesive "Voncoat ES141" (tradename of Dainippon Ink and Chemicals, Inc.) was coated on Nylon taffeta using a gravure roll of 50 meshes, dried, pressure-bonded to the film obtained in Example 52, heat treated at 120° C. for 5 minutes and then, aged at room temperature for more than 24 hours, thereby a moisture-permeable waterproof composite material of this invention was obtained.

It was a moisture-permeable waterproof composite material of low environmental load having moisture permeability of 16,000 g/m²·24 h and water pressure resistance of 0.27 MPa in which moisture permeability and water pressure resistance are compatible.

Example 72

A moisture-permeable waterproof composite material of this invention was prepared in the same way of Example 66 except using the film obtained in Example 64.

It was a moisture-permeable, waterproof film of low environmental load having moisture permeability of 4,300 g/m²·24 h and water pressure resistance of 0.14 MPa in which moisture permeability and water pressure resistance are compatible.

Example 73

A moisture-permeable waterproof composite material of this invention was prepared by the same way as Example 23 except using nylon taffeta B as a substrate material and coating and film-forming were carried out with a clearance of 0.15 mm.

The moisture permeability was 16,000 g/m²·24 h and the water pressure resistance was 0.22 MPa and it was a moisture-permeable waterproof composite material of low environmental load having a high moisture permeability.

Example 74

A moisture-permeable waterproof composite material of this invention was prepared by the same way as Example 23 except using nylon taffeta C as a substrate material and coating and film-forming were carried out with a clearance of 0.15 mm.

The moisture permeability was 18,000 g/m²·24 h and the water pressure resistance was 0.23 MPa and it was a moisture-permeable waterproof composite material of low environmental load having a high moisture permeability.

Example 75

A moisture-permeable waterproof composite material of this invention was prepared by the same way as Example 23 except using the polyester taffeta as a substrate material and coating and film-forming were carried out with a clearance of 0.15 mm.

The moisture permeability was 20,000 g/m²·24 h and the water pressure resistance was 0.20 MPa and it was a moisture-permeable waterproof composite material of low environmental load having a high moisture permeability.

Comparative Example 1

A composite material was prepared in the same way as Example 5 except using "SANPREN HMP17A" (tradename of Sanyo Chemical Industries, Ltd.) alone.

It was a composite material of high environmental load as shown in Tables 3 and 4.

Comparative Example 2

A film for comparison (film thickness 50 micrometers) was prepared in the same way as Example 34 except using undiluted liquid of "UA310" as the resin liquid.

The moisture permeability was 3,600 g/m²·24 h and the film strength was 28 MPa and it was a film of low moisture permeability, although its film strength was high.

Comparative Example 3

A film for comparison (film thickness 50 micrometers) was prepared in the same way as Example 22 except using undiluted liquid of "D2060" as the resin liquid.

The moisture permeability was 4,200 g/m²·24 h and the film strength was 25 MPa and it was a film of low moisture permeability, although its film strength was high.

Comparative Example 4

A film for comparison (film thickness 50 micrometers) was prepared in the same way as Example 22 except using a resin liquid in which undiluted liquid of "D2060" 20 parts and undiluted liquid of an oxazoline type crosslinking agent "EPOCROS WS 700" (tradename of Nippon Shokubai Co., Ltd.; oxazoline equivalent 4.5 mmol/g) 0.5 part were mixed.

The moisture permeability was 4,400 g/m²·24 h and the film strength was 25 MPa and it was a film of low moisture permeability, although its film strength was high.

Comparative Example 5

A film for comparison (film thickness 50 micrometers) was prepared in the same way as Example 54 except using undiluted liquid of "107M" as the resin liquid.

The moisture permeability was 3,600 g/m²·24 h and the film strength was 30 MPa and it was a film of low moisture permeability, although its film strength was high.

Comparative Example 6

A film for comparison (film thickness 50 micrometers) was prepared in the same way as Example 54 except using undiluted liquid of "2770" as the resin liquid.

The moisture permeability was 2,200 g/m²·24 h and the film strength was 8 MPa and it was a film of low moisture permeability, although its film strength was high.

Comparative Example 7

A film for comparison (film thickness 50 micrometers) was prepared in the same way as Example 54 except using undiluted liquid of "E-4000" as the resin liquid.

The moisture permeability was 8,500 g/m²·24 h and the film strength was 9 MPa and it was a film of low moisture permeability, although its film strength was high.

Comparative Example 8

A film for comparison (film thickness 50 micrometers) was prepared in the same way as Example 64 except using a resin liquid in which undiluted liquid of "E-4000" 20 parts, undiluted liquid of a methylol melamine resin "Sumitex resin M-3" (tradename of Sumitomo Chemitex Co., Ltd.) 0.22 part and undiluted liquid of an amine type catalyst "Sumitex accelerator ACX" (tradename of Sumitomo Chemitex Co., Ltd.) 0.02 part were mixed.

The moisture permeability was 9,000 g/m²·24 h and the film strength was 8 MPa and it was a film of low moisture permeability, although its film strength was high.

Comparative Example 9

A material for comparison was prepared in the same way as Example 66 except using the film obtained in Comparative example 2.

The moisture permeability was 1,000 g/m²·24 h and the water pressure resistance was 0.03 MPa and it was a material of low moisture permeability and of low water pressure resistance.

Comparative Example 10

A material for comparison was prepared in the same way as Example 66 except using the film obtained in Comparative example 4.

The moisture permeability was 1,100 g/m²·24 h and the water pressure resistance was 0.25 MPa and it was a material of low moisture permeability, although its water pressure resistance was high.

Comparative Example 11

A material for comparison was prepared in the same way as Example 66 except using the film obtained in Comparative example 9.

The moisture permeability was 1,100 g/m²·24 h and the water pressure resistance was 0.25 MPa and it was a material of low moisture permeability, although its water pressure resistance was high.

INDUSTRIAL APPLICABILITY

According to this invention, by utilizing a resin which has an excellent moisture permeability, waterproofness, material durability, and further capability of being made aqueous, a moisture-permeable, waterproof film and a moisture-permeable waterproof composite material which can be manufactured by an ecological process can be obtained.

TABLE 1

| | Resin/particle size nm | Bishydroxyalkyl aliphatic acid mmol/g (polymer) | Bishydroxyalkyl aliphatic acid mmol/g (resin layer) | Polyethylene glycol Wt % | Other alkylene glycol | Main crosslinking structure (group) |
|---|---|---|---|---|---|---|
| Example 1 | water-soluble polyurethane/self-emulsifiable polyurethane/65 | 0.248 0.295 | 0.256 | PEG1000 33.6 | tetramethylene glycol | isocyanate-hydroxyl methylol-hydroxyl |
| Example 2 | water-soluble polyurethane/self-emulsifiable polyurethane/57 | 0.248 0.295 | 0.256 | PEG1000 33.6 | tetramethylene glycol | isocyanate-hydroxyl methylol-hydroxyl |
| Example 3 | water-soluble polyurethane/self-emulsifiable polyurethane/65 | 0.248 0.295 | 0.256 | PEG1000 33.6 | tetramethylene glycol | — |
| Example 4 | water-soluble polyurethane/self-emulsifiable polyurethane/65 | 0.248 0.295 | 0.256 | PEG1000 33.6 | tetramethylene glycol | isocyanate-hydroxyl methylol-hydroxyl |
| Example 5 | water-soluble polyurethane/self-emulsifiable polyurethane/65 | 0.248 0.295 | 0.256 | PEG1000 33.6 | tetramethylene glycol | isocyanate-hydroxyl methylol-hydroxyl |
| Example 6 | water-soluble polyurethane/self-emulsifiable polyurethane/58 | 0.248 0.213 | 0.224 | PEG1000 47 | hexamethylene glycol | isocyanate-hydroxyl methylol-hydroxyl |
| Example 7 | water-soluble polyurethane/self-emulsifiable polyurethane/100 | 0.248 0.179 | 0.213 | PEG1000 33.6 | hexamethylene glycol | isocyanate-hydroxyl methylol-hydroxyl |
| Example 8 | Water-soluble polyurethane/self-emulsifiable polyurethane/65 | 0.248 0.295 | 0.256 | PEG1000 33.6 | tetramethylene glycol | isocyanate-hydroxyl methylol-hydroxyl |

TABLE 1-continued

| | Resin/particle size nm | Bishydroxyalkyl aliphatic acid mmol/g (polymer) | Bishydroxyalkyl aliphatic acid mmol/g (resin layer) | Polyethylene glycol Wt % | Other alkylene glycol | Main crosslinking structure (group) |
|---|---|---|---|---|---|---|
| Example 9 | Water-soluble polyurethane/self-emulsifiable polyurethane/65 | 0.248 0.295 | 0.256 | PEG1000 33.6 | tetramethylene glycol | isocyanate-hydroxyl methylol-hydroxyl |
| Example 10 | Water-soluble polyurethane/self-emulsifiable polyurethane/65 | 0.248 0.295 | 0.256 | PEG1000 33.6 | tetramethylene glycol | isocyanate-hydroxyl methylol-hydroxyl |

TABLE 2

| | Moisture permeability g/m² · 24 h | Water resistance MPa | Retention ratio of water resistance % | Organic solvent content wt % (coating liquid) | Water content wt % (coating liquid) | Organic solvent content wt % (material) |
|---|---|---|---|---|---|---|
| Example 1 | 83,500 | 0.8 | — | 0.37 | 270 | — |
| Example 2 | 78,000 | 0.75 | — | 0.37 | 270 | — |
| Example 3 | 168,000 | 0.68 | — | 0.37 | 270 | — |
| Example 4 | 80,800 | 0.86 | — | 0.37 | 1138 | — |
| Example 5 | 69,500 | 0.73 | — | 0.37 | 270 | — |
| Example 6 | 48,000 | 0.66 | — | 0.36 | 271 | — |
| Example 7 | 32,000 | 0.77 | — | 14.8 | 255 | — |
| Example 8 | 19,500 | 0.88 | 100 | 0.37 | 270 | 0.04 |
| Example 9 | 23,200 | 0.76 | 100 | 0.37 | 270 | 0.04 |
| Example 10 | 14,300 | 0.55 | 100 | 0.37 | 270 | 0.04 |

TABLE 3

| | Resin/particle size nm | Bishydroxyalkyl aliphatic acid mmol/g (polymer) | Bishydroxyalkyl aliphatic acid Mmol/g (resin layer) | Polyethylene glycol Wt % | Other alkylene glycol | Main crosslinking structure (group) |
|---|---|---|---|---|---|---|
| Example 11 | water-soluble polyurethane/self-emulsifiable polyurethane/65 | 0.248 0.295 | 0.256 | PEG1000 33.6 | tetramethylene glycol | isocyanate-hydroxy methylol-hydroxyl |
| Example 12 | water-soluble polyurethane/self-emulsifiable polyurethane/65 | 0.248 0.295 | 0.256 | PEG1000 33.6 | tetramethylene glycol | isocyanate-hydroxy methylol-hydroxyl |
| Example 13 | water-soluble polyurethane/self-emulsifiable polyurethane/65 | 0.248 0.295 | 0.256 | PEG1000 33.6 | tetramethylene glycol | isocyanate-hydroxy methylol-hydroxyl |
| Example 14 | water-soluble polyurethane/self-emulsifiable polyurethane/65 | 0.248 0.295 | 0.256 | PEG1000 33.6 | tetramethylene glycol | isocyanate-hydroxy methylol-hydroxyl |
| Example 15 | water-soluble polyurethane/self-emulsifiable polyurethane/65 | 0.248 0.295 | 0.256 | PEG1000 33.6 | tetramethylene glycol | isocyanate-hydroxy methylol-hydroxyl |
| Example 16 | water-soluble polyurethane/self-emulsifiable polyurethane/65 | 0.248 0.295 | 0.256 | PEG1000 33.6 | tetramethylene glycol | oxazoline-carboxy methylol-hydroxyl |
| Example 17 | water-soluble polyurethane/self-emulsifiable polyurethane/65 | 0.248 0.295 | 0.256 | PEG1000 33.6 | tetramethylene glycol | isocyanate-hydroxy epoxy-hydroxyl |
| Example 18 | water-soluble polyurethane/water-soluble polyester/- | 0.248 — | 0.151 | PEG1000 33.6 | — | isocyanate-hydroxy methylol-hydroxyl |
| Example 19 | water-soluble polyurethane/water-soluble silicone/- | 0.248 | — | PEG1000 33.6 | — | isocyanate-hydroxy methylol-hydroxyl |
| Example 20 | water-soluble polyurethane/aqueoud acryl/- | 0.248 | — | PEG1000 33.6 | — | isocyanate-hydroxy methylol-hydroxyl |
| Example 21 | water-soluble polyurethane/- | 0.248 | 0.248 | PEG1000 67.2 | — | isocyanate-hydroxy methylol-hydroxyl |
| Comparative Example 1 | organic solvent type polyurethane/- | — | — | PEG 80 | — | isocyanate-hydroxy methylol-hydroxyl |

TABLE 4

|  | Moisture permeability g/m² · 24 h | Water resistance MPa | Retention ratio of water resistance % | Organic solvent content wt % (coating liquid) | Water content wt % (coating liquid) | Organic solvent content wt % (material) |
| --- | --- | --- | --- | --- | --- | --- |
| Example 11 | 8,800 | 0.12 | 70 | 0.37 | 270 | 0.04 |
| Example 12 | 22,000 | 0.02 | 75 | 0.37 | 270 | 0.04 |
| Example 13 | 21,000 | 0.15 | 80 | 0.37 | 270 | 0.04 |
| Example 14 | 11,000 | 0.37 | 100 | 0.37 | 270 | 23.8 |
| Example 15 | 11,000 | 0.28 | 90 | 0.37 | 270 | 0.04 |
| Example 16 | 18,800 | 0.68 | 100 | 0.37 | 270 | 0.04 |
| Example 17 | 17,900 | 0.75 | 100 | 0.37 | 270 | 0.04 |
| Example 18 | 10,500 | 0.2 | 90 | 0 | 270 | 0 |
| Example 19 | 8,300 | 0.2 | 82 | 0 | 270 | 0 |
| Example 20 | 7,600 | 0.15 | 72 | 27.8 | 259 | 2.5 |
| Example 21 | 27,000 | 0.05 | 35 | 0 | 257 | 0 |
| Comparative example 1 | 8,800 | 1.5 | 60 | 334 | 0 | 30.4 |

The invention claimed is:

1. A moisture-permeable, waterproof film comprising a resin layer containing two or more resins including, as polymerizing components, bishidroxyalkyl aliphatic acid and alkyleneglycol, said bishydroxyalkyl aliphatic acid content is not less than 0.08 mmol/g and not more than 0.5 mmol/g, at least a part of said alykyleneglycol is polyethylene glycol contained in an amount of not less than 20 wt % and not more than 60 wt % based on said solid resin, and a moisture permeability by JIS L-1099 "Potassium Acetate Method" (B-1 method) at average film thickness of 20 micrometers being not less than $3 \times 10^3$ g/m²·24 h and not more than $200 \times 10^3$ g/m²·24 h.

2. A moisture-permeable, waterproof film according to claim 1 wherein a number of carbon atoms of alkylene repeating unit of said alkyleneglycol is not less than 3 and not more than 12.

3. A moisture-permeable, waterproof film according to claim 1 wherein both of said two resins are polyurethane type resin.

4. A moisture-permeable, waterproof film according to claim 1 wherein the water-resistant pressure by JIS L-1092 "High Water Pressure Method" is not less than 0.1 MPa and not more than 1.0 MPa.

5. A moisture-permeable waterproof composite material wherein a moisture-permeable, waterproof film claimed in claim 1 is provided at least on one surface of a substrate material and has a moisture permeability by JIS L-1099 "Potassium Acetate Method" (B-1 method) of not less than $1 \times 10^3$ g/m²·24 h and not more than $50 \times 10^3$ g/m² 24 h.

6. A moisture-permeable waterproof composite material according to claim 5 characterized in that it has a retention ratio of water-resistant pressure of not less than 80% and not more than 100%.

* * * * *